US011411736B2

(12) United States Patent
Murdoch et al.

(10) Patent No.: US 11,411,736 B2
(45) Date of Patent: Aug. 9, 2022

(54) AUTOMATIC RENEWAL OF A VERIFIABLE CLAIM

(71) Applicant: Microsoft Technology Licensing, LLC, Redmond, WA (US)

(72) Inventors: Brandon Murdoch, Reading (GB); Ankur Patel, Sammamish, WA (US); Guillermo P. Proano, Sammamish, WA (US); Nithya Ganesh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

(21) Appl. No.: 16/808,130

(22) Filed: Mar. 3, 2020

(65) Prior Publication Data

US 2021/0281411 A1  Sep. 9, 2021

(51) Int. Cl.
*G06F 21/64* (2013.01)
*G06F 21/45* (2013.01)
*H04L 9/32* (2006.01)
*G06Q 20/38* (2012.01)
*G06F 21/31* (2013.01)

(52) U.S. Cl.
CPC ..... *H04L 9/3218* (2013.01); *G06Q 20/38215* (2013.01)

(58) Field of Classification Search
None
See application file for complete search history.

(56) References Cited

U.S. PATENT DOCUMENTS

| 10,482,219 | B2 * | 11/2019 | Fuse | G06F 8/71 |
| 11,212,296 | B2 * | 12/2021 | Oberhauser | G06F 21/33 |
| 2002/0120579 | A1 * | 8/2002 | Kawaguchi | G06F 21/121 |
| | | | | 705/59 |
| 2014/0026193 | A1 | 1/2014 | Saxman et al. | |

(Continued)

FOREIGN PATENT DOCUMENTS

| EP | 2911364 A1 | 8/2015 |
| WO | 2016065321 A1 | 4/2016 |

OTHER PUBLICATIONS

Customer Relationship Management of VFS Global. Rahman. (Year: 2019).*

(Continued)

*Primary Examiner* — Venkat Perungavoor
(74) *Attorney, Agent, or Firm* — Workman Nydegger

(57) ABSTRACT

Updating a verifiable claim so that a duration of the verifiable claim can be modified without direct user input. A plurality of verifiable claims that have previously been issued to a user are accessed by a computing system. The plurality of verifiable claims include duration metadata that defines a duration of each of the plurality of verifiable claims. The duration metadata of each of the plurality of verifiable claims is monitored to determine those of the plurality of verifiable claims that are set to expire based on the defined duration. For those verifiable claims that are set to expire, a request is made to a party that issued each verifiable claim for update information that is configured to modify the duration of each verifiable claim. In response to receiving the update information, the duration of each verifiable claim is automatically updated without the need for any direct user input.

19 Claims, 9 Drawing Sheets

(56) References Cited

U.S. PATENT DOCUMENTS

| | | | | |
|---|---|---|---|---|
| 2014/0230020 | A1* | 8/2014 | Mogaki | H04L 9/3213 |
| | | | | 726/4 |
| 2017/0061105 | A1* | 3/2017 | Minagawa | G06F 21/105 |
| 2020/0145223 | A1* | 5/2020 | Yang | H04L 9/083 |
| 2020/0145229 | A1* | 5/2020 | Li | H04L 9/3271 |
| 2021/0126791 | A1* | 4/2021 | Lu | H04L 9/085 |
| 2021/0160075 | A1* | 5/2021 | Lu | G06Q 20/3825 |

OTHER PUBLICATIONS

User acceptance of Malaysian government multipurpose smartcard applications. Loo. (Year: 2009).*
An Improved Vehicle Registration and Licensing System. Adisa. (Year: 2021).*
CN112600831. English Translation. (Year: 2021).*
FairCASH: Concepts and Framework. Ching. IEEE. (Year: 2008).*
The Utilization of Blockchain for Enhancing Big Data Security and Veracity. Wibowo. (Year: 2020).*
Towards a Blockchain based digital identity verification, record attestation and record sharing system. Adyar. (Year: 2020).*
Research on decentralized identity and access management model based on the OIDC protocol. Li. IEEE. (Year: 2020).*
A Framework for Maintaining Citizenship Record on Blockchain. Jha. ACM. (Year: 2019).*
"International Search Report and Written Opinion Issued in PCT Application No. PCT/US2021/0151361", dated Apr. 23, 2021, 10 Pages.

* cited by examiner

AUTOMATIC RENEWAL OF A VERIFIABLE CLAIM

BACKGROUND

A digital identity is a mechanism to keep track of an entity across different digital contexts. After an identity is determined, appropriate action can be taken related to the entity that has the identity. As an example, authorizations, privileges, customizations and access can be provided to the entity. Thus, digital identities are an important mechanism to ensure that information is restricted to appropriate trust boundaries via appropriate containment of authorizations and privileges. Digital identities are also an important mechanism to ensure a positive and consistent user experience when accessing their data and customizations.

Most currently used documents or records that prove identity are issued by centralized organizations, such as governments, corporations, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. When a party needs to verify another party's identity, the verifying party often needs to go through the centralized identity management system to obtain information verifying and/or authenticating the other party's identity.

Decentralized Identifiers (DIDs) are a more recent type of identifier. Decentralized identifiers are independent of any centralized registry, identity provider, or certificate authority. Distributed ledger technology (such as blockchain) provides the opportunity for using fully decentralized identifiers. Distributed ledger technology uses distributed ledgers to record transactions between two or more parties in a verifiable way. Once a transaction is recorded, the data in the section of ledger cannot be altered retroactively without the alteration of all subsequent sections of ledger. This provides a fairly secure platform in which it is difficult or impossible to tamper with data recorded in the distributed ledger. Since a DID is generally not controlled by a centralized management system, but rather is owned by an owner of the DID, DIDs are sometimes referred to as identities without authority.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Existing computing technologies provide for a data structure called a "verifiable claim or credential". In these technologies, a claims issuer makes one or more claims about a subject, and generates the verifiable claim. The verifiable claim include those claim(s) as well as proof instructions to prove that claim(s) have not been tampered with and were indeed issued by the claims issuer. The verifiable claim also often includes duration information metadata that defines a period of time that the verifiable claim is valid for use or that defines a specific number of times that the verifiable claim is authorized for use. The claims issuer then provides the verifiable claim to a claims holder, for presentation to any relying party that relies upon the veracity of those claims.

As an example, the claims issuer might be a computing system associated with a government agency in charge of issuing driver licenses. The government agency may generate a verifiable claim with claims about a citizen, such as the birthdate, residence address, weight, eye color, hair color, authorization to drive, restrictions on authorization to drive, and so forth. The government agency issues the verifiable claim to the citizen. If the user is stopped by law enforcement, the citizen may present the verifiable claim, whereby a computing system associated with law enforcement may use the proof instructions to verify that the claims were issued by the government agency and indeed have not been tampered with since issuance. In another example, an organization that provides inoculations may issue claims to a parent of a child that assert that the child has received certain inoculations. The parent may then present these inoculation claims to a school where the child is to attend.

As mentioned, the verifiable claim often includes duration information metadata that defines a duration of the verifiable claim. For example, the defined duration specifies a time period the verifiable claim can be used by the holder before it expires. Alternatively, the defined duration specifies a specific number of times the verified claim can be used by the holder before it expires. Upon expiration of the specified time period or use the specified number of times, the holder is no longer able to present the verifiable claim to a relying party.

Upon the expiration of the verifiable claim, the holder is able to request that the issuer update the verifiable claim so that is can be used again. However, if the holder has had a large number of verifiable claims issued to him or her, it can be burdensome and time consuming for the holder to track the duration information metadata to determine what verifiable claims are about to expire and what issuer need to be contacted for the update. In addition, this presents an inefficient use of the computing systems and devices of the holder as he or she will typically use processing resources tracking the duration information metadata that could be used for beneficial tasks.

The principles described herein aim to solve at least some of the above-mentioned problems by providing a verifiable credential service that monitors the duration information data for all the verifiable claims issued to a specific holder. When the verifiable credential service determines that one or more of the verifiable claims is set to expire based on the defined duration of the verifiable claim, the verifiable credential service is able to contact the claims issuer to see if the claims issuer desires to provide update information that will update or modify the duration of the verifiable claim. If so, the verifiable credential service is able to automatically update or modify the duration of the verifiable claim. From the perspective of the holder, this happens in the background without any direct input from him or her, thus removing the time burden on the holder. In addition, since the verifiable credential service is monitoring the verifiable claims and initiating the update process, computing resources of the holder are much more efficiently used.

In some instances, verifiable credential service can be utilized by a claims issuer. For example, a claims issuer who issues a large number of verifiable claims to many different holders is able to utilize the verifiable credential service to monitor and initiate an update process in much the same way as the holder is able to. This also results in a much more efficient use of the issuer's computing resources.

In one embodiment, a plurality of verifiable claims that have previously been issued to a user are accessed by a computing system. The plurality of verifiable claims include duration metadata that defines a duration of each of the plurality of verifiable claims. The duration metadata of each of the plurality of verifiable claims is monitored to determine those of the plurality of verifiable claims that are set to expire based on the defined duration. For those verifiable claims that are set to expire, a request is made to a party that issued each verifiable claim for update information that is configured to modify the duration of each verifiable claim. In response to receiving the update information, the duration of each verifiable claim is automatically updated without the need for any direct user input.

In some embodiments each verifiable claim is allowed to expire if no update information is received from the party that issued each verifiable claim.

In some embodiments the duration information metadata comprises an expiration time of the corresponding verifiable claim or a predetermined number of times that the corresponding verifiable claim can be accessed or used.

In some embodiments each verifiable claim is automatically allowed to expire in response to a directive received from the party that issued each verifiable claim. In other embodiments the user is allowed to manually cause the verifiable claim to expire.

In some embodiments the update information is new duration information metadata that specifies a new, extended time period or number of uses. In such embodiments automatically modifying the duration of the verifiable claim comprises modifying each verifiable claim to include the new duration information metadata, the new duration information metadata setting the duration to the new, extended time period or number of uses.

In some embodiments the update information is a new verifiable claim that includes new duration information metadata that specifies a new time period or number of uses, but that is otherwise substantially the same as the verifiable claim that is about to expire. In such embodiments automatically modifying the duration of the verifiable claim comprises replacing the verifiable claim that is about to expire with the new verifiable claim.

In some embodiments the verifiable claims comprise at least (1) a Decentralized Identifier (DID), (2) a property of the subject entity, (3) a value corresponding to the property, (4) a unique identifier identifying the corresponding verifiable claims, and (5) one or more conditions for accessing the verifiable claims. The one or more conditions comprising at least one of the following: (1) requiring a relying entity to pay a predetermined amount of value, (2) requiring a relying entity to provide identification information, (3) requiring a relying entity to provide one or more verifiable claim(s), (4) requiring a relying entity to grant permission for accessing a portion of data, or (5) requiring a relying entity to provide a particular service.

In some embodiments the computing system is associated with a management module controlled by the user. In other embodiments the computing system is associated with the party that issued each verifiable claim. In further embodiments the computing system is associated with a third party cloud computing provider.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Updating a verifiable claim so that a duration of the verifiable claim can be modified without direct user input. A plurality of verifiable claims that have previously been issued to a user are accessed by a computing system. The plurality of verifiable claims include duration metadata that defines a duration of each of the plurality of verifiable claims. The duration metadata of each of the plurality of verifiable claims is monitored to determine those of the plurality of verifiable claims that are set to expire based on the defined duration. For those verifiable claims that are set to expire, a request is made to a party that issued each verifiable claim for update information that is configured to modify the duration of each verifiable claim. In response to receiving the update information, the duration of each verifiable claim is automatically updated without the need for any direct user input.

Because the principles described herein is performed in the context of a computing system, some introductory discussion of a computing system will be described with respect to FIG. 1. Then, this description will return to the principles of the embodiments disclosed herein with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that are executed by a processor. The memory takes any form and depends on the nature and form of the computing system. A computing system is distributed over a network environment and includes multiple constituent computing systems.

Figure 1:
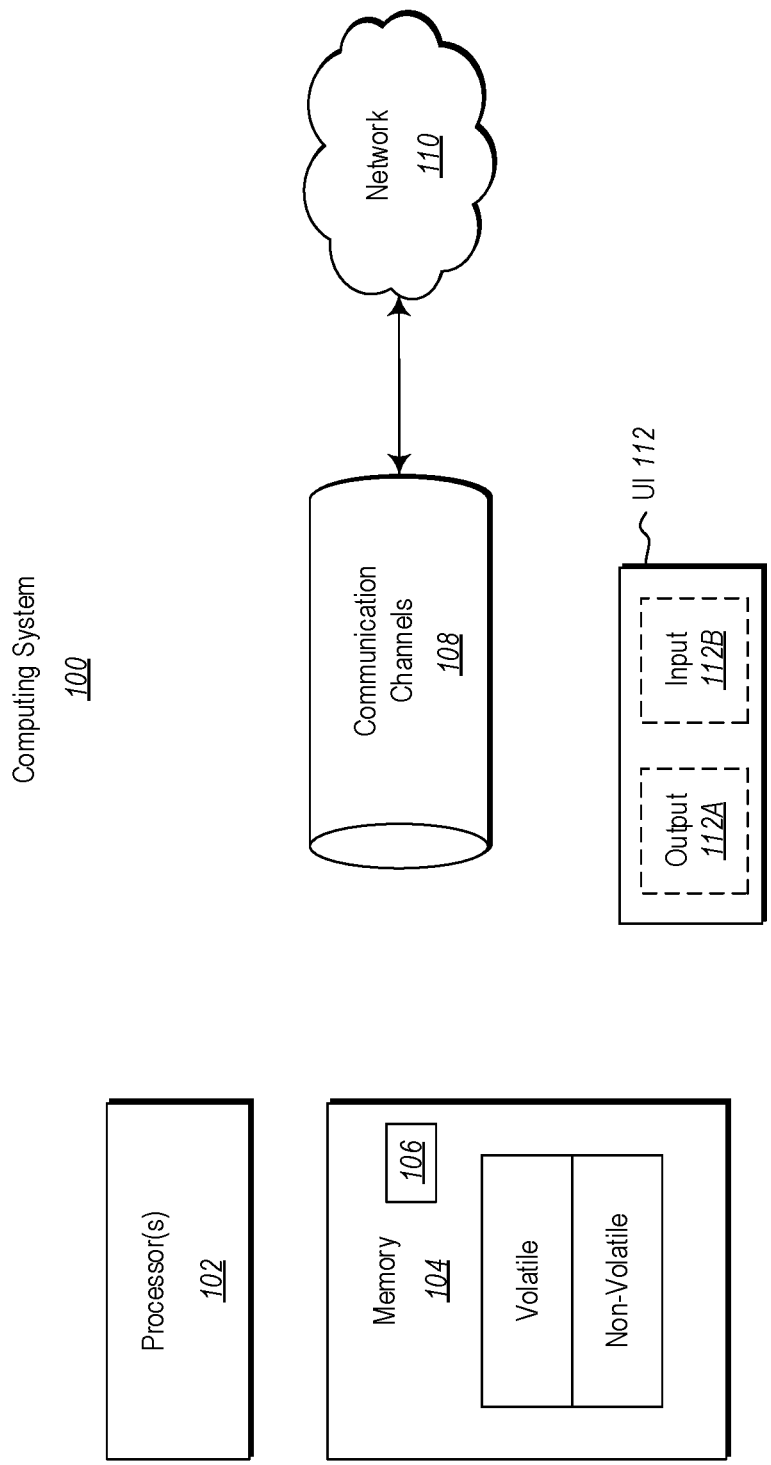
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 includes a general-purpose processor and also includes a field-programmable gate array (FPGA), an application-specific integrated circuit (ASIC), or any other specialized circuit. The memory 104 is physical system memory, which is volatile, non-volatile, or some combination of the two. The term "memory" also be used herein to refer to non-volatile mass storage such as physical storage media. If the computing system is distributed, the processing, memory and/or storage capability is distributed as well.

The computing system 100 also has thereon multiple structures often referred to as an "executable component". For instance, memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component include software objects, routines, methods, and so forth, that is executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure is computer-readable directly by the processors (as is the case if the executable component were binary). Alternatively, the structure is structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions are embodied on one or more computer-readable media that form a computer program product. An example of such an operation involves the manipulation of data. If such acts are implemented exclusively or near-exclusively in hardware, such as within an FPGA or an ASIC, the computer-executable instructions are hardcoded or hard-wired logic gates. The computer-executable instructions (and the manipulated data) is stored in the memory 104 of the computing system 100. Computing system 100 also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 includes output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse or other pointer input, sensors of any type, and so forth.

Embodiments described herein comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions configure the computing system to perform a certain function or group of functions. The computer executable instructions are, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention is practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. In some cases, the invention also is practiced in distributed system environments where local and remote computing systems, which are linked (either by hardwired data links, wireless data links, or by a combination of hardwired and wireless data links) through a network, both perform tasks. In a distributed system environment, program modules are located in both local and remote memory storage devices.

Those skilled in the art will also appreciate that the invention is practiced in a cloud computing environment. Cloud computing environments are distributed, although this is not required. When distributed, cloud computing environments are distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures discuss various computing system which corresponds to the computing system 100 previously described. The computing systems of the remaining figures include various components or functional blocks that implement the various embodiments disclosed herein as will be explained. The various components or functional blocks are implemented on a local computing system or are implemented on a distributed computing system that includes elements resident in the cloud or that implement aspects of cloud computing. The various components or functional blocks are implemented as software, hardware, or a combination of software and hardware. The computing systems of the remaining figures include more or less than the components illustrated in the figures and some of the components are combined as circumstances warrant. Although not necessarily illustrated, the various components of the computing systems access and/or utilize a processor and memory, such as processor 102 and memory 104, as needed to perform their various functions.

Figure 2:
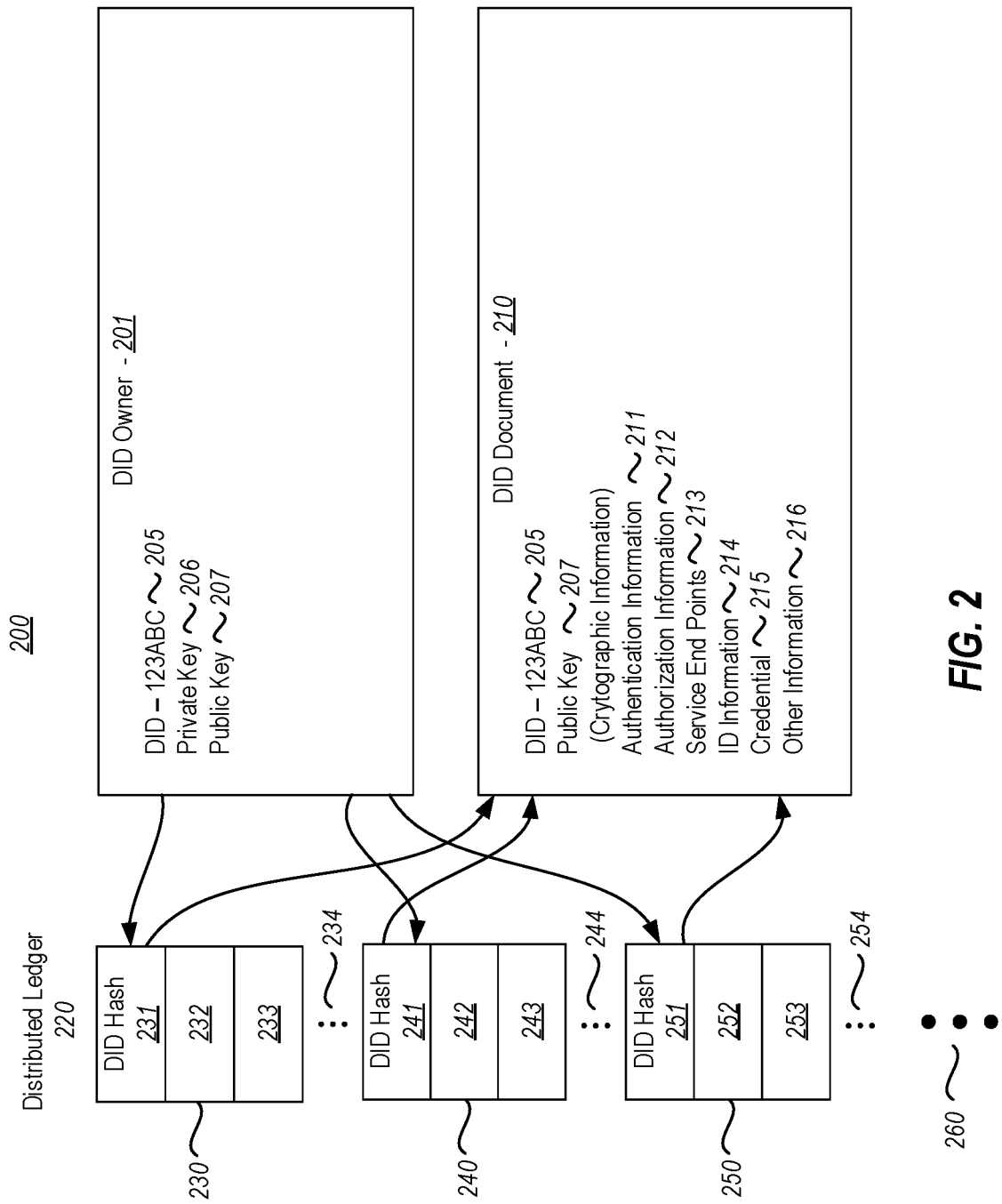
FIG. 2 illustrates an example environment for creating a decentralized identification or identifier (DID)

Some introductory discussions of a decentralized identification (DID) and the environment in which they are created and reside will now be given with respect to FIG. 2. As illustrated in FIG. 2, a DID owner 201 owns or controls a DID 205 that represents an identity of the DID owner 201. The DID owner 201 registers a DID using a creation and registration service, which will be explained in more detail below.

The DID owner 201 is any entity that could benefit from a DID. For example, the DID owner 201 is a human being or an organization of human beings. Such organizations might include a company, department, government, agency, or any other organization or group of organizations. Each individual human being might have a DID while the organization(s) to which each belongs might likewise have a DID.

The DID owner 201 alternatively be a machine, system, or device, or a collection of machine(s), device(s) and/or system(s). In still other embodiments, the DID owner 201 is a subpart of a machine, system or device. For instance, a device could be a printed circuit board, where the subpart of that circuit board are individual components of the circuit board. In such embodiments, the machine or device has a DID and each subpart also have a DID. A DID owner might also be a software component such as the executable component 106 described above with respect to FIG. 1. An example of a complex executable component 106 might be an artificial intelligence. An artificial intelligence also owns a DID.

Thus, the DID owner 201 is any reasonable entity, human or non-human, that is capable of creating the DID 205 or at least having the DID 205 created for and associated with them. Although the DID owner 201 is shown as having a single DID 205, this need not be the case as there is any number of DIDs associated with the DID owner 201 as circumstances warrant.

As mentioned, the DID owner 201 creates and registers the DID 205. The DID 205 is any identifier that is associated with the DID owner 201. Preferably, that identifier is unique to that DID owner 201, at least within a scope in which the DID is anticipated to be in use. As an example, the identifier is a locally unique identifier, and perhaps more desirably a globally unique identifier for identity systems anticipated to operate globally. In some embodiments, the DID 205 is a Uniform Resource Identifier (URI) (such as a Uniform Resource Locator (URL)) or other pointers that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein). Accordingly, the DID 205 is any identifier that is under the control of the DID owner 201 and independent of any centralized authority.

In some embodiments, the structure of the DID 205 is as simple as a username or some other human-understandable term. However, in other embodiments, the DID 205 preferably be a random string of numbers and letters for increased security. In one embodiment, the DID 205 is a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 201. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair is generated on a device controlled by the DID owner 201. The private key 206 and public key 207 pairs should not be generated on a server controlled by any centralized authority as this causes the private key 206 and public key 207 pairs to not be fully under the control of the DID owner 201 at all times. Although FIG. 2 and this description have described a private and public key pair, it will also be noted that other types of reasonable cryptographic information and/or mechanism also be used as circumstances warrant.

FIG. 2 also illustrates a DID document 210 that is associated with the DID 205. As will be explained in more detail to follow, the DID document 210 is generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 is implemented according to methods specified by a distributed ledger 220 that will be used to store a representation of the DID 205 as will be explained in more detail to follow. Thus, the DID document 210 has different methods depending on the specific distributed ledger.

The DID document 210 also includes the public key 207 created by the DID owner 201 or some other equivalent cryptographic information. The public key 207 is used by third-party entities that are given permission by the DID owner 201 to access information and data owned by the DID owner 201. The public key 207 also be used by verifying that the DID owner 201, in fact, owns or controls the DID 205.

The DID document 210 also includes authentication information 211. The authentication information 211 specify one or more mechanisms by which the DID owner 201 is able to prove that the DID owner 201 owns the DID 205. In other words, the mechanisms of authentication information 211 show proof of a binding between the DID 205 (and thus it's DID owner 201) and the DID document 210. In one embodiment, the authentication information 211 specifies that the public key 207 be used in a signature operation to prove the ownership of the DID 205. Alternatively, or in addition, the authentication information 211 specifies that the public key 207 be used in a biometric operation to prove ownership of the DID 205. Accordingly, the authentication information 211 includes any number of mechanisms by which the DID owner 201 is able to prove that the DID owner 201 owns the DID 205.

The DID document 210 also includes authorization information 212. The authorization information 212 allows the DID owner 201 to authorize third party entities the rights to modify the DID document 210 or some part of the document without giving the third party the right to prove ownership of the DID 205. For example, the authorization information 212 allows the third party to update any designated set of one or more fields in the DID document 210 using any designated update mechanism. Alternatively, the authorization information allows the third party to limit the usages of DID 205 by the DID owner 201 for a specified time period. This is useful when the DID owner 201 is a minor child and the third party is a parent or guardian of the child. The authorization information 212 allows the parent or guardian to limit the use of the DID 205 until such time as the child is no longer a minor.

The authorization information 212 also specifies one or more mechanisms that the third party will need to follow to prove they are authorized to modify the DID document 210. In some embodiments, this mechanism is similar to those discussed previously with respect to the authentication information 211.

The DID document 210 also includes one or more service endpoints 213. A service endpoint includes a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers are used by the DID owner 201 or by third party entities to access the services that operate on behalf of the DID owner 201. Specific examples of service endpoints 213 will be explained in more detail to follow.

The DID document 210 further includes identification information 214. The identification information 214 includes personally identifiable information such as the name, address, occupation, family members, age, hobbies, interests, or the like of DID owner 201. Accordingly, the identification information 214 listed in the DID document 210 represents a different persona of the DID owner 201 for different purposes. For instance, a persona is pseudo-anonymous, e.g., the DID owner 201 include a pen name in the DID document when identifying him or her as a writer posting articles on a blog; a persona is fully anonymous, e.g., the DID owner 201 only want to disclose his or her job title or other background data (e.g., a school teacher, an FBI agent, an adult older than 21 years old, etc.) but not his or her name in the DID document; and a persona is specific to who the DID owner 201 is as an individual, e.g., the DID owner 201 includes information identifying him or her as a volunteer for a particular charity organization, an employee of a particular corporation, an award winner of a particular award, etc.

The DID document 210 also includes credential information 215, which also be referred to herein as an attestation. The credential information 215 (also referred to as a verifiable claim) is any information that is associated with the DID owner 201's background. For instance, the credential information 215 is (but not limited to) a qualification, an achievement, a government ID, a government right such as a passport or a driver's license, a digital asset provider or bank account, a university degree or other educational history, employment status and history, or any other information about the DID owner 201's background.

The DID document 210 also includes various other information 216. In some embodiments, the other information 216 includes metadata specifying when the DID document 210 was created and/or when it was last modified. In other embodiments, the other information 216 includes cryptographic proofs of the integrity of the DID document 210. In still further embodiments, the other information 216 includes additional information that is either specified by the specific method implementing the DID document or desired by the DID owner 201.

FIG. 2 also illustrates a distributed ledger or blockchain 220. The distributed ledger 220 is any decentralized, distributed network that includes various computing systems that are in communication with each other. For example, the distributed ledger 220 includes a first distributed computing system 230, a second distributed computing system 240, a third distributed computing system 250, and any number of additional distributed computing systems as illustrated by the ellipses 260. The distributed ledger or blockchain 220 operates according to any known standards or methods for distributed ledgers. Examples of conventional distributed ledgers that correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 is stored on the actually distributed ledger. Alternatively, in other embodiments the DID document 210 is stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID has 231, DID has 241, and DID has 251, which are ideally identical copies of the same DID. The DID hash 231, DID hash 241, and DID hash 251 then point to the location of the DID document 210. The distributed ledger or blockchain 220 also store numerous other representations of other DIDs as illustrated by references 232, 233, 234, 242, 243, 244, 252, 253, and 254.

In one embodiment, when the DID owner 201 creates the DID 205 and the associated DID document 210, the DID has 231, DID has 241, and DID hash 251 are written to the distributed ledger or blockchain 220. The distributed ledger or blockchain 220 thus records that the DID 205 now exists. Since the distributed ledger or blockchain 220 is decentralized, the DID 205 is not under the control of any entity outside of the DID owner 201. The DID hash 231, DID has 241, and DID has 251 includes, in addition to the pointer to the DID document 210, a record or timestamp that specifies when the DID 205 was created. At a later date when modifications are made to the DID document 210, this also is recorded in DID has 231, DID has 241, and DID has 251. The DID has 231, DID has 241, and DID hash 251 further includes a copy of the public key 207 so that the DID 205 is cryptographically bound to the DID document 210.

Figure 3:
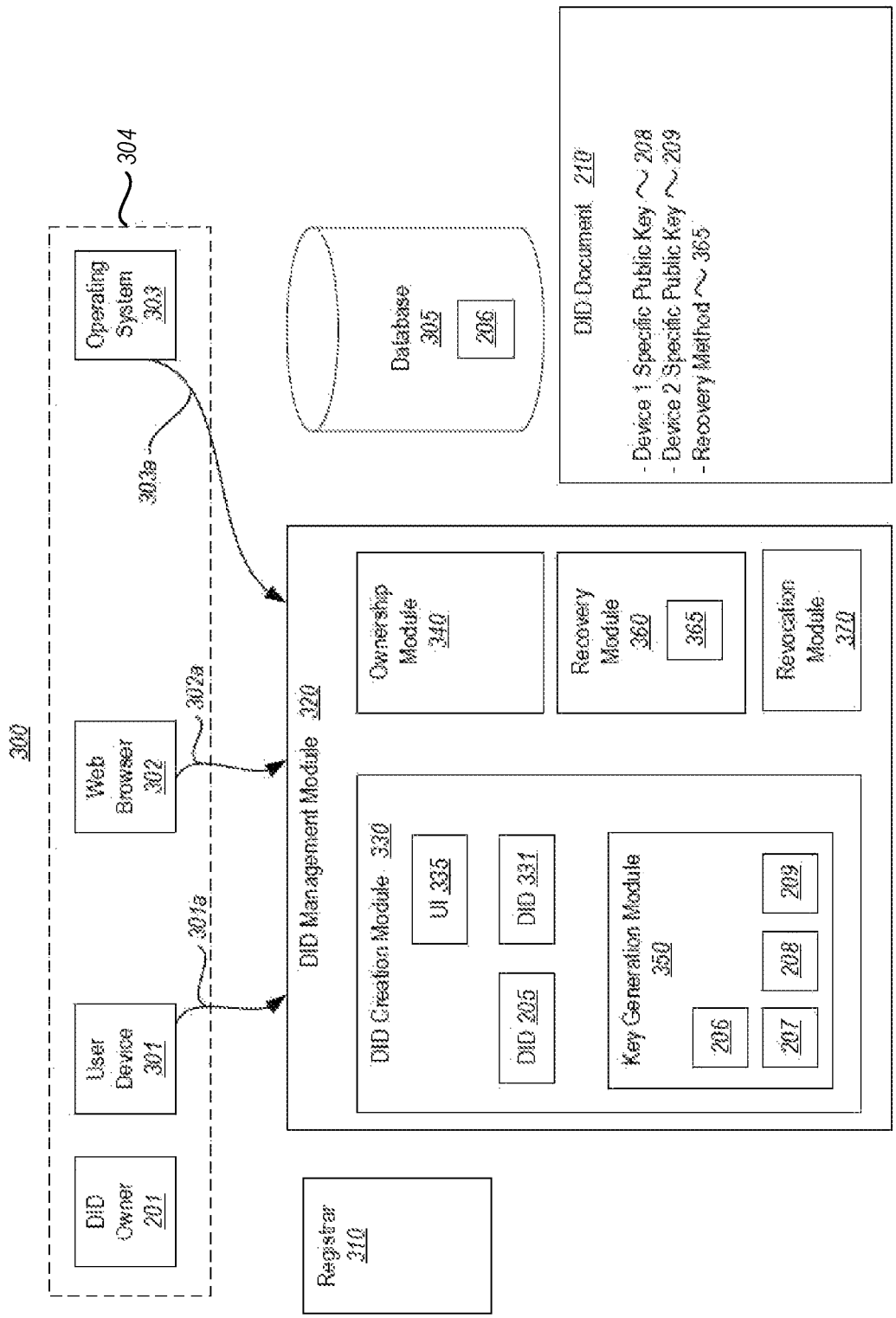
FIG. 3 illustrates an example environment for various DID management operations and services.

Having described DIDs and how they operate generally with reference to FIG. 2, specific embodiments of DIDs will now be explained. Turning to FIG. 3, an environment 300 that is used to perform various DID lifecycle management operations and services will now be explained. It will be appreciated that the environment of FIG. 3 reference elements from FIG. 2 as needed for ease of explanation.

As shown in FIG. 3, the environment 300 includes various devices and computing systems that are owned or otherwise under the control of the DID owner 201. These include a user device 301. In some cases, the user device 301 is a mobile device such as a smartphone, a computing device such as a laptop computer, or any device such as a car or an appliance that includes computing abilities. The device 301 includes a web browser 302 operating on the device and an operating system 303 operating the device. More broadly speaking, the dashed line 304 represents that all of these devices are owned or otherwise under the control of the DID owner 201.

The environment 300 also includes a DID lifecycle management module 320. Sometimes, the DID lifecycle management module 320 also be referred to as a wallet or an agent. It will be noted that in operation, the DID lifecycle management module 320 reside on and be executed by one or more of user device 301, web browser 302, and the operating system 303 as illustrated by the lines 301a, 302a, and 303a. Accordingly, DID lifecycle management module 320 is shown as being separate for ease of explanation.

As shown in FIG. 3, the DID lifecycle management module 320 includes a DID creation module 330. The DID creation module 330 is used by the DID owner 201 to create the DID 205 or any number of additional DIDs, such as DID 331. In one embodiment, the DID creation module includes or otherwise has access to a User Interface (UI) element 335 that guide the DID owner 201 in creating the DID 205. The DID creation module 330 has one or more drivers that are configured to work with the particular distributed ledgers such as distributed ledger 220 so that the DID 205 complies with the underlying methods of that distributed ledger.

A specific embodiment will now be described. For example, UI 335 provides a prompt for the user to enter a username or some other human recognizable name. This name is used as a display name for the DID 205 that will be generated. As previously described, the DID 205 is a long string of random numbers and letters and so having a human recognizable name for a display name be advantageous. The DID creation module 330 then generates the DID 205. In the embodiments having the UI 335, the DID 205 is shown in a listing of identities and is associated with the human recognizable name.

The DID creation module also includes a key generation module 350. The key generation module generates the private key 206 and public key 207 pairs previously described. The DID creation module 330 then uses the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record the DID hash 231, DID hash 241, and DID hash 251 in the distributed ledger in the manner previously described and to store the DID document 210 in the manner previously described. This process uses the public key 207 in the has generation.

In some embodiments, the DID lifecycle management module 320 includes an ownership module 340. The ownership module 340 provides mechanisms that ensure that the DID owner 201 is aware that the DID owner 201 is in sole control of the DID 205. In this way, the provider of the DID lifecycle management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 is used by all devices associated with the DID owner 201 and all third parties that desire to provide services to the DID owner 201. Accordingly, when the DID owner 201 desires to associate a new device with the DID 205, the DID owner 201 executes the DID creation module 330 on the new device. The DID creation module 330 then uses the registrar 310 to update the DID document 210 to reflect that the new device is now associated with the DID 205 and this would be reflected in an updated transaction on the distributed ledger 220 as previously described.

In some embodiments, however, it is advantageous to have a public key per device 301 owned by the DID owner 201 as this allows the DID owner 201 to sign with the specific device public key without having to access a general public key. In other words, since the DID owner 201 will use different devices at different times (for example using a mobile phone in one instance and then using a laptop computer in another instance) it is advantageous to have a key associated with each device to provide efficiencies in signing using the keys. Accordingly, in such embodiments, the key generation module generates additional public keys 208 and 209 when the additional devices execute the DID creation module 330. These additional public keys are associated with private key 206 or in some instances is paired with a new private key.

In those embodiments where the additional public keys 208 and 209 are associated with different devices, the additional public keys 208 and 209 are recorded in the DID document 210 as being associated with those devices. This is shown in FIG. 3. It will be appreciated that the DID documents 210 include the information previously described in relation to FIG. 2 in addition to the information shown in FIG. 3. If the DID document 210 existed prior to the device-specific public keys being generated, then the DID document 210 would be updated by the creation module 330 via the registrar 310 and this would be reflected in an updated transaction on the distributed ledger 220.

In some embodiments, the DID owner 201 can keep the association of a device with a public key or even with the DID 205 a secret. Accordingly, the DID creation module 330 causes that such data be secretly shown in the DID document 210.

As described thus far, the DID 205 has been associated with all the devices under the control of the DID owner 201, even when the devices have their own public keys. However, in some embodiments it is useful for each device or some subset of devices under the control of the DID owner 201 to each have their own DID. Thus, in some embodiments the DID creation module 330 generates an additional DID, for example, DID 331, for each device. The creation module would then generate private and public key pairs and DID documents for each of the devices and have them recorded on the distributed ledger 220 in the manner previously described. Such embodiments are advantageous for devices that change ownership as it is possible to associate the specific device DID to the new owner of the device by granting the new owner authorization rights in the DID document and revoking such rights from the old owner.

As mentioned, the private key, to ensure that it is totally in the control of the DID owner 201, is created on the user device 301, browser 302, or operating system 303 owned or controlled by the DID owner 201 that executed the DID management module 320. In this way, there is little chance that a third party gains control of the private key 206, especially the provider of the DID lifecycle management module 320. However, there is a chance that the device storing the private key 206 is lost by the DID owner 201, which causes the DID owner 201 to lose access to the DID 205. Accordingly, in some embodiments, the UI 335 includes the option to allow the DID owner 201 to export the private key 206 to an off device secured database 305 that is under the control of the DID owner 201. In some embodiments, the private key 206 is stored as a QR code that scanned by the DID owner 201.

In other embodiments, the DID lifecycle management module 320 includes a recovery module 360 that is used to recover a lost private key 206. In operation, the recovery module 360 allows the DID owner 201 to select one or more recovery mechanisms 365 at the time the DID 205 is created that later be used to recover the lost private key. In those embodiments having the UI 335, the UI 335 allow the DID owner 201 to provide required information that will be needed by the one or more recovery mechanisms 365 when the recovery mechanisms are implemented. The recovery module then be run on any device associated with the DID 205.

The DID lifecycle management module 320 also includes a revocation module 370 that is used to revoke or sever a device from the DID 205. In operation, the revocation module uses the UI element 335, which allows the DID owner 201 to indicate a desire to remove a device from being associated with the DID 205. In one embodiment, the revocation module access the DID document 210 and causes that all references to the device be removed from the DID document. Alternatively, the public key for the device is removed. This change in the DID document 210 then is reflected as an updated transaction on the distributed ledger 220 as previously described.

Figure 4:
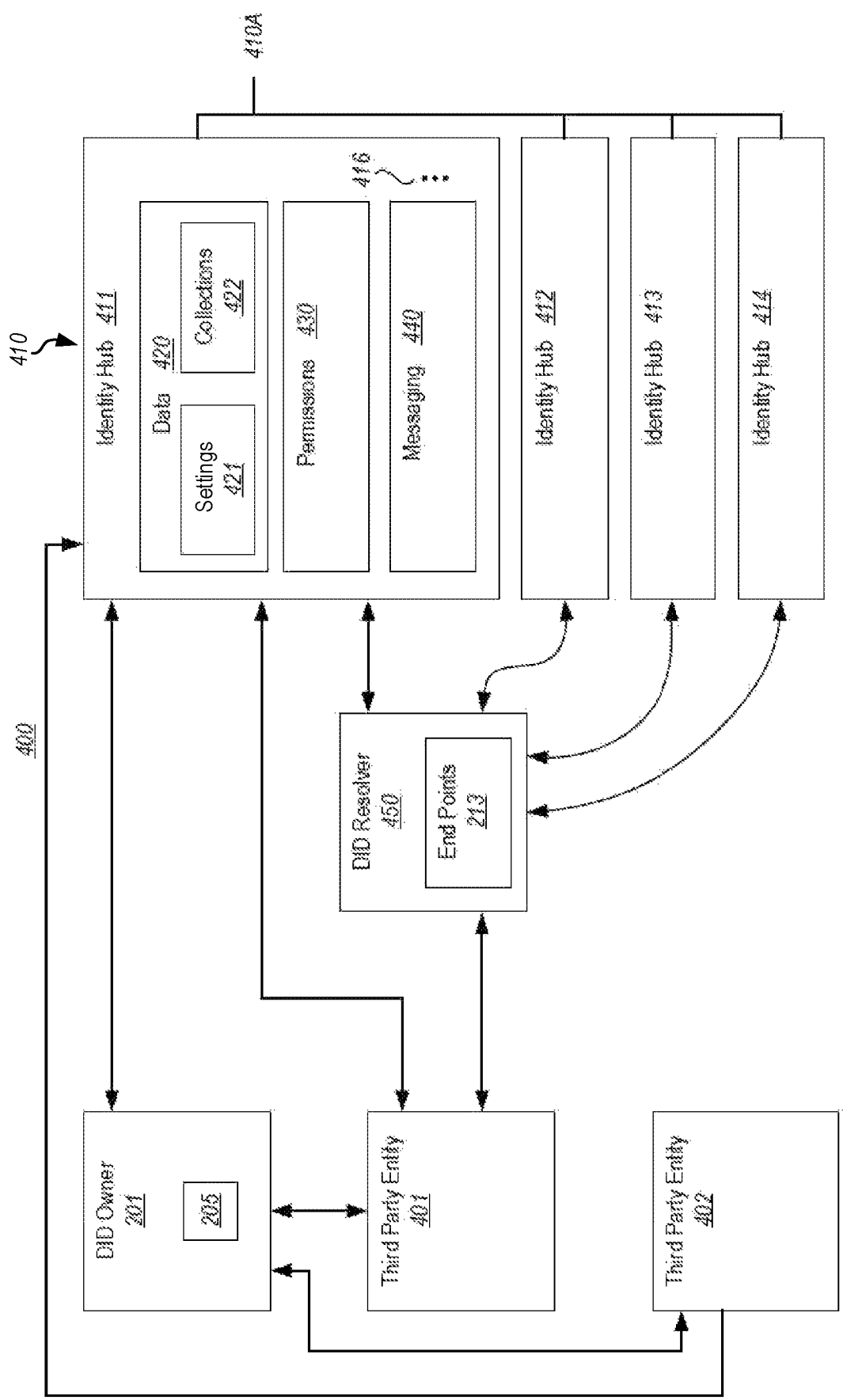
FIG. 4 illustrates an example decentralized personal storage or identity hub.

FIG. 4 illustrates an embodiment of an environment 400 in which a DID such as DID 205 is utilized. Specifically, the environment 400 will be used to describe the use of the DID 205 in relation to one or more decentralized personal storages or identity hubs. An identity hub is a storage of attributes, including keys and metadata under the control of the holder of the DID. It will be noted that FIG. 4 includes references to elements first discussed in relation to FIG. 2 or 3 and thus use the same reference numeral for ease of explanation.

In one embodiment, the identity hubs 410 are multiple instances of the same identity hub. This is represented by line 410A. Thus, the various identity hubs 410 include at least some of the same data and services. Accordingly, if any change is made to one of the identity hubs 410, the change is reflected in the remaining identity hubs. For example, the first identity hub 411 and second identity hub 412 are implemented in cloud storage and thus is able to hold a large amount of data. Accordingly, a full set of the data is stored in these identity hubs. However, the identity hubs 412 and 413 have less memory space. Accordingly, in these identity hubs a descriptor of the data stored in the first and second identity hubs is included. Alternatively, a record of changes made to the data in other identity hubs is included. Thus, changes in one of the identity hubs 410 are either fully replicated in the other identity hubs or at least a record or descriptor of that data is recorded in the other identity hubs.

Because the identity hubs are multiple instances of the same identity hub, only a full description of the first identity hub 411 will be provided as this description also applies to the identity hubs 412-415. As illustrated, identity hub 411 includes data storage 420. The data storage 420 is used to store any type of data that is associated with the DID owner 201. In one embodiment the data is a collection 422 of a specific type of data corresponding to a specific protocol. For example, in some cases, collection 422 is medical records data that corresponds to a specific protocol for medical data. In some other cases, collection 422 is any other type of data.

In one embodiment, the stored data have different authentication and privacy settings 421 associated with the stored data. For example, a first subset of the data has a setting 421 that allows the data to be publicly exposed, but that does not include any authentication to the DID owner 201. This type of data is for relatively unimportant data such as color schemes and the like. A second subset of the data has a setting 421 that allows the data to be publicly exposed and that includes authentication to the DID owner 201. A third subset of the data has a setting 421 that encrypts the subset of data with the private key 206 and public key 207 pair (or some other key pair) associated with the DID owner 201. This type of data will require a party to have access to the public key 207 or to some other associated public key in order to decrypt the data. This process also includes authentication to the DID owner 201. A fourth subset of the data has a setting 421 that restricts this data to a subset of third parties. This requires that public keys associated with the subset of third parties be used to decrypt the data. For example, the DID owner 201 causes the setting 421 to specify that only public keys associated with friends of the DID owner 201 decrypt this data.

In some embodiments, the identity hub 411 has a permissions module 430 that allows the DID owner 201 to set specific authorization or permissions for third parties such as third parties 401 and 402 to access the identity hub. For example, the DID owner 201 provides access permission to his or her spouse to all the data 420. Alternatively, the DID owner 201 allows access to his or her doctor for any medical records. It will be appreciated that the DID owner 201 permission to any number of third parties to access a subset of the data 420. This will be explained in more detail to follow.

The identity hub 411 also has a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipses 416 represent that the identity hub 411 has additional services as circumstances warrant.

In one embodiment, the DID owner 201 wish to authenticate a new device 301 with the identity hub 411 that is already associated with the DID 205 in the manner previously described. Accordingly, the DID owner 201 utilizes the DID management module 320 associated with the new user device 301 to send a message to the identity hub 411 asserting that the new user device is associated with the DID 205 of the DID owner 201.

However, the identity hub 411 not initially recognize the new device as being owned by the DID owner 201. Accordingly, the identity hub 411 uses the messaging module 440 to contact the DID resolver 450. The message sent to the DID resolver 450 includes the DID 205.

The DID resolver 450 is a service, application, or module that is configured in operation to search the distributed ledger 220 for DID documents associated with DIDs. Accordingly, in the embodiment the DID resolver 450 search the distributed ledger 220 using the DID 205, which result in the DID resolver 450 finding the DID document 210. The DID document 210 then be provided to the identity hub 411.

As discussed previously, the DID document 210 includes a public key 208 or 209 that is associated with the new user device 301. To verify that the new user device is owned by the DID owner 201, the identity hub 411 provides a cryptographic challenge to the new user device 301 using the messaging module 440. This cryptographic challenge will be structured such that only a device having access to the private key 206 will be able to successfully answer the challenge In the embodiment, since the new user device is owned by DID owner 201 and thus has access to the private key 206, the challenge is successfully answered. The identity hub 411 then records in the permissions 430 that the new user device 301 is able to access the data and services of the identity hub 411 and also the rest of the identity hubs 210.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 provide the DID 205 to the third party entity 401 so that the third party access data or services stored on the identity hub 411. For example, the DID owner 201 is a human who is at a scientific conference who desires to allow the third party 401, who is also a human, access to his or her research data. Accordingly, the DID owner 201 provide the DID 205 to the third party 401.

Once the third party 401 has access to the DID 205, he or she access the DID resolver 450 to access the DID document 210. As previously discussed, the DID document 210 include an endpoint 213 that is an address or pointer to the identity hub 411. The third party 401 then use the address or pointer to access the identity hub 411.

The third party 401 send a message to the messaging module 440 asking for permission to access the research data. The messaging module 440 then send a message to the DID owner 201 asking if the third party 401 should be given access to the research data. Because the DID owner desires to provide access to this data, the DID owner 201 allow permission to the third party 401 and this permission is recorded in the permissions 430.

The messaging module 440 then message the third party 401 informing the third party that he or she is able to access the research data. The identity hub 411 and the third party 401 then directly communicate so that the third party access the data. It will be noted that in many cases, it will actually be an identity hub associated with the third party 401 that communicates with the identity hub 411. However, it a device of the third party 401 that does the communication.

Advantageously, the above-described process allows the identity hub 411 and the third party 401 to communicate and to share the data without the need for the third party to access the identity hub 411 in a conventional manner. Rather, the communication is provisioned in a decentralized manner using the DID 205 and the DID document 210. This advantageously allows the DID owner to be in full control of the process.

As briefly discussed above, the identity hub 411 is hosted in a cloud service. The service provider has access to the data stored in each user's identity hub 411. Furthermore, the service provider also has access to certain activities of the DID owner. For example, the entities with whom the DID owner has shared his/her data is stored in the identity hub 411. As another example, a user has multiple DIDs and has shared data amongst the multiple DIDs, alternatively, the user has used different DID management modules to access the same data. Based on the data sharing activities, the service provider of the identity hub 411 correlate the relationships of different DIDs and find out that two DIDs is related or owned by the same owner. Thus, the user's privacy is compromised.

The principles described herein will solve these potential privacy concerns of DID owners by encrypting the personal data stored in the identity hub 411. The encryption/decryption keys are not stored or accessible by the identity hub 411, so that the DID owners not only have great control over their data from other DID owners or users, but also have their privacy protected from the service providers.

There are many different objects stored in the identity hub 411. A data object is a file, a folder, or any portion of data stored in the identity hub 411. The whole identity hub 411 is encrypted with one encryption/decryption key as one object. Alternatively, a different portion of the data stored in the identity hub 411 is encrypted with different encryption/decryption keys.

In another example embodiment, verifiable claims (e.g., credential information 215) are issued and stored at the identity hub 411. For example, a verifiable claim that is associated with a DID owner 201 is issued by a claim issuing entity, and the issued verifiable claim is stored at the identity hub 411 that is associated with the DID owner 201. The DID owner 201 send the verifiable claim to another entity when the other entity requires to verify the credential of the DID owner. For example, the DID owner 201 is a person holding a driver's license, and the claim issuing entity is a DMV that has issued the DID owner's driver's license. The DMV issue a verifiable claim that verifies that the DID owner 201 is holding a valid driver's license. The DID owner 201 stores the verifiable claim in the identity hub 411. Another entity is a rental car company, which requires the DID owner 201 to show that he/she has a valid driver's license. The DID owner then sends the verifiable claim stored at the identity hub 411 to the rental car company.

Figure 5:
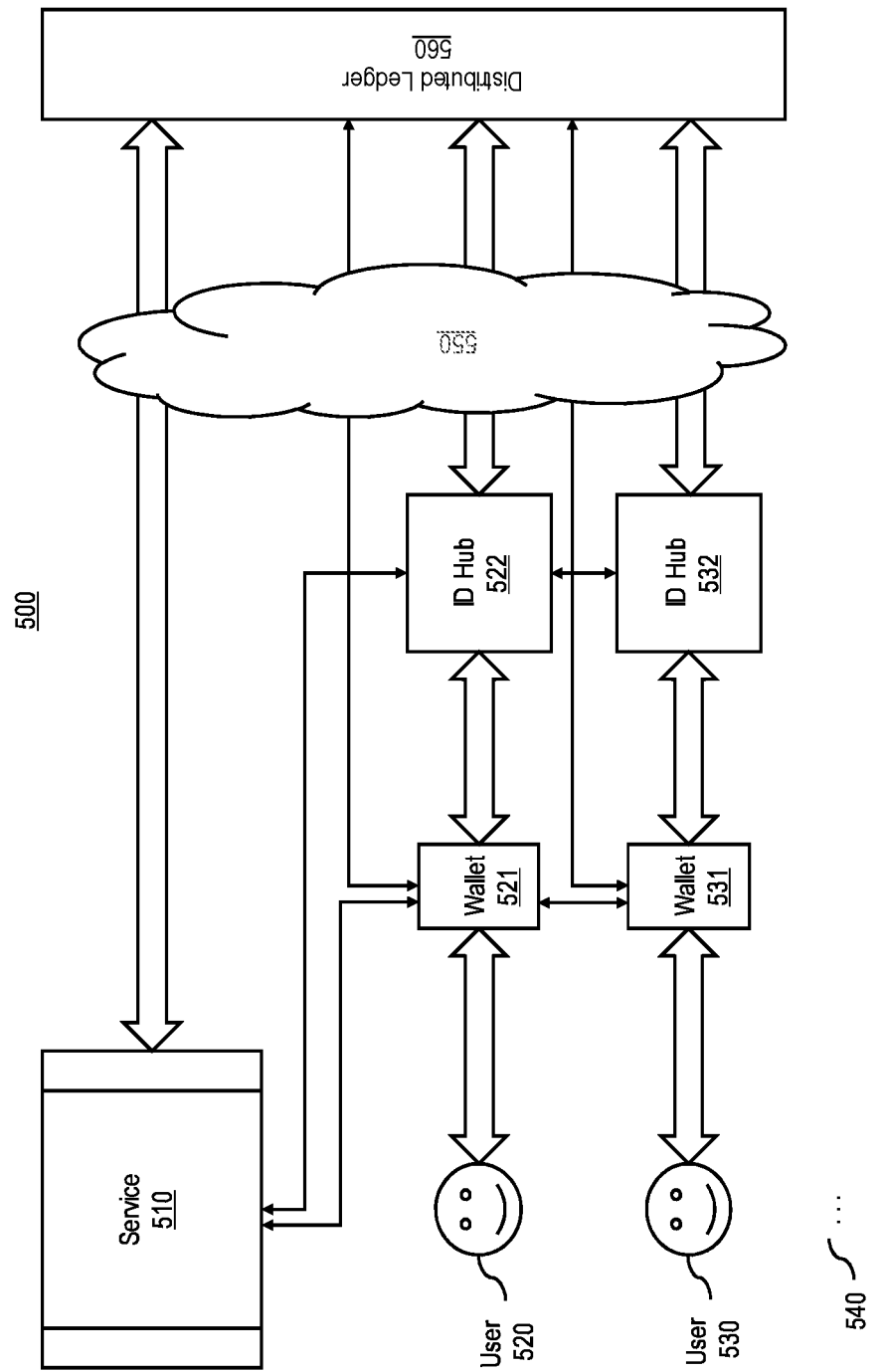
FIG. 5 illustrates an example environment, in which the principles described herein are implemented.

Having described DIDs and how they operate generally with reference to FIGS. 2-4, specific embodiments of decentralized identification will now be explained. Turning to FIG. 5, a decentralized environment 500 that allows DID owners to access services and perform transactions with other DID owners while identifying themselves will now be explained. It will be appreciated that FIG. 5 references elements from FIGS. 2-4 as needed for ease of explanation.

As illustrated in FIG. 5, the decentralized environment 500 includes a device associated with a service provider 510, a wallet apps 521 and 522 of users 520 and 530 (e.g., DID owners). The ellipsis 540 represents that there may be any number of devices associated with any number of service providers and/or users in the decentralized environment 500. Each of the service provider (s) and users 520, 530 corresponds to a DID owner 201 of FIG. 2. The wallet app 521 or 531 corresponds to the DID management module 320 of FIG. 3. The ID hub 522 or ID hub 532 corresponds to the ID hub 411 of FIG. 4.

User 520 uses a wallet app 521 to manage his/her DIDs, and user 520 uses a wallet app 531 to manage his/her DIDs. The wallet app 521 or 531 is connected to a respective ID hub 522 or 531. Each of the service provider's device 510 and wallet apps 521, 531 has access to the distributed ledger via a computer network 550. In some embodiments, the wallet app 521 or 531 has indirect access to the distributed ledger via the ID hub 522 or 532. In some embodiments, the wallet app 521 or 531 is configured to store a complete copy of the distributed ledger or has direct access to the distributed ledger via the computer network 550.

The device of the service provider 510 and each wallet apps 521, 531 and/or ID hubs 522, 532 are capable of communicating with each other via various communication channels, including, but not limited to, local area network, a wide area network, a BLE beacon signal, and/or near field communication (NFC). The communication can also be performed via generating a bar code or a QR code that by one wallet app 521, and scanning the bar code or a QR code by another wallet app 531 or the device of the service provider 510. The barcode or the QR code includes the identification information related to the user 520, such as the DID associated with the user 520.

In some embodiments, the service 510 may act as an issuer. As used herein, an "issuer" is an entity that makes at least one assertion about a subject. That assertion is also called herein a "claim". A "credential" is a set of one or more claims. Examples of issuers include corporations, organizations, associations, governments, agencies, individuals, or any other entity that can make assertions that could be relied upon by others. Thus, the service 510 may provide one or more verifiable claims or credentials about the user 520 or user 530, who such instance act as a "holder". The users 520 and 530 can store the verifiable claims in the ID hub 522 and ID hub 532 respectively. A relying party (not illustrated) is a party that relies on the verifiable claims or credentials so as to ascertain information about the holder.

For example, suppose that the service 510 is the Department of Motor Vehicles (DMV). While acting as an "issuer" the service 510 issues a verifiable claim to the user 520 that asserts that the user 520 has a valid driver's license issued by the DMV. The user 520 as the "holder" is then able to provide the verifiable claim related to the driver's license to a relaying party that needs this information. For example, suppose a relying party (not illustrated) is a car rental agency. The user 520 presents the verifiable claim related to the driver's license to the car rental agency when he or she wants to rent a car and the car rental agency is able to use the verifiable claim related to the driver's license to ascertain that the user 520 has a valid driver's license that can be used to rent the car.

Figure 6B:
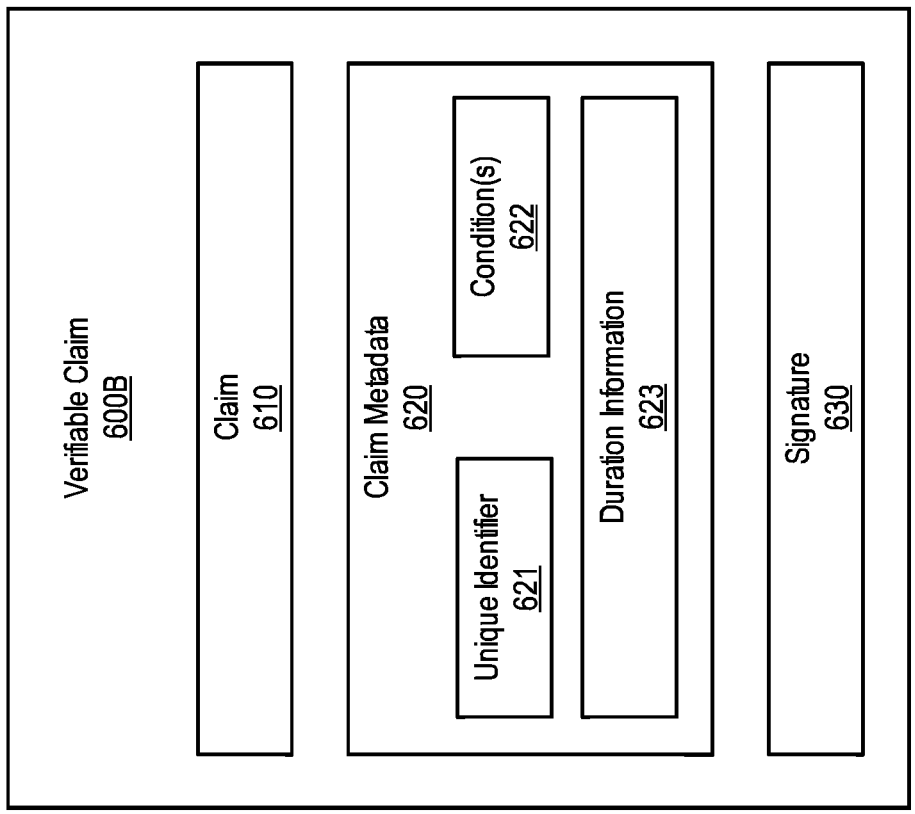
FIG. 6B illustrates an example verifiable claim.
Figure 6A:
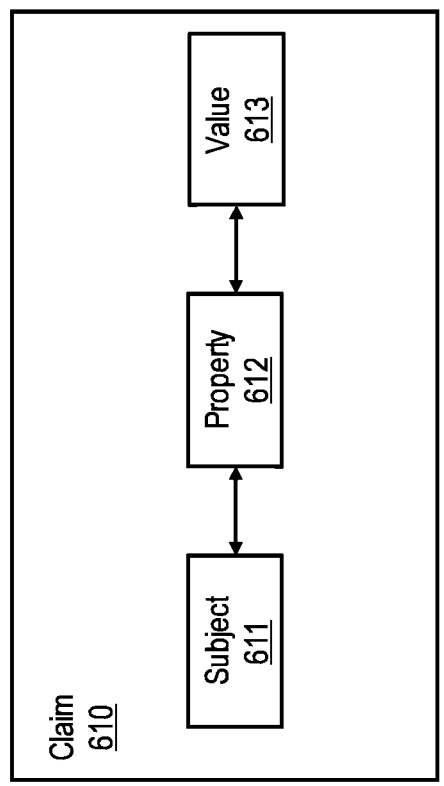
FIG. 6A illustrates an example claim.

FIG. 6A illustrates an example data structure that represents a claim 610. The claim 610 includes a subject 611, a property 612 and a value 613. For example, the subject 611 corresponds to an owner of a DID, and the DID is recorded as the subject 611. The property 612 may be any property of the owner of the DID, such as a name, a phone number, an email address, etc. The value 613 is the value of the corresponding property 612. For example, when the property is "name", the value would be the name of the owner of the DID, e.g., John Doe; when the property is "phone number", the value would be the phone number of the owner of the DID, e.g., 1-800-123-4567.

FIG. 6B illustrates an example data structure of a verifiable claim or credential 600B. In some embodiments, the data structure of the verifiable claim or credential is referred to as a Portable Identity Card (PIC) and is way for the issuer (e.g., service 510) to organize the verifiable claim in a manner that is easily understood by the user (e.g., user 520 or user 530). The verifiable claim or credential 600B includes claim 610, which corresponds to the claim 610 of FIG. 6A. The verifiable claim or credential 600B also includes a signature 630, which is generated by signing the claim 610 by a private key of the issuer. The signature 630 is typically a cryptographic mechanism (such as a digital signature) that is used to detect whether the verifiable claim or credential 600B has been tampered with since the time that the verifiable claim or credential 600B was issued, and can be used to verify identity of the issuer of the verifiable claim or credential 600B.

Once the verifiable claim or credential 600B is generated, at least a portion of data related to the verifiable claim or credential 600B is propagated onto a distributed ledger (e.g., 220, 560), such that a relying entity can use the portion of data propagated onto the distributed ledger to validate the verifiable claim or credential 600B. In some embodiments, the public key corresponding to the private key of the issuer is propagated onto the distributed ledger. In some embodiments, a hash of the public key or a hash of the verifiable claim or credential 600B is propagated onto the distributed ledger.

In some embodiments, the verifiable claim or credential 600B also includes various metadata related to the self-issued claim 600B. For example, the metadata includes, but is not limited to, (1) a unique identifier identifying the corresponding verified claim or credential 621, (2) one or more conditions 622 for accessing the verifiable claim or credential 600B, or (3) duration information 623 related to a duration of time that the issuer wants the verifiable claim or credential 600B to be valid for.

The one or more conditions metadata 622 for accessing the verifiable claim or credential 600B, but are not limited to, (1) requiring the relying entity to pay a predetermined amount of cryptocurrency, (2) requiring the relying entity to provide identification information, (3) requiring the relying entity to provide one or more verifiable claim(s), (4) requiring the relying entity to grant permission for accessing a portion of data, and/or (5) requiring the relying entity to provide a particular service.

The duration information metadata 623 includes, but is not limited to, (1) an expiration time of the corresponding verifiable claim or credential 600B, (2) a predetermined number of times that the corresponding verifiable claim or credential 600B can be accessed or used, (3) a mechanism that automatically causes the verifiable claim or credential 600B to expire in response to a directive from the issuer, or (4) a mechanism that allows the user to manually cause the verifiable claim or credential 600B to expire.

Figure 7A:
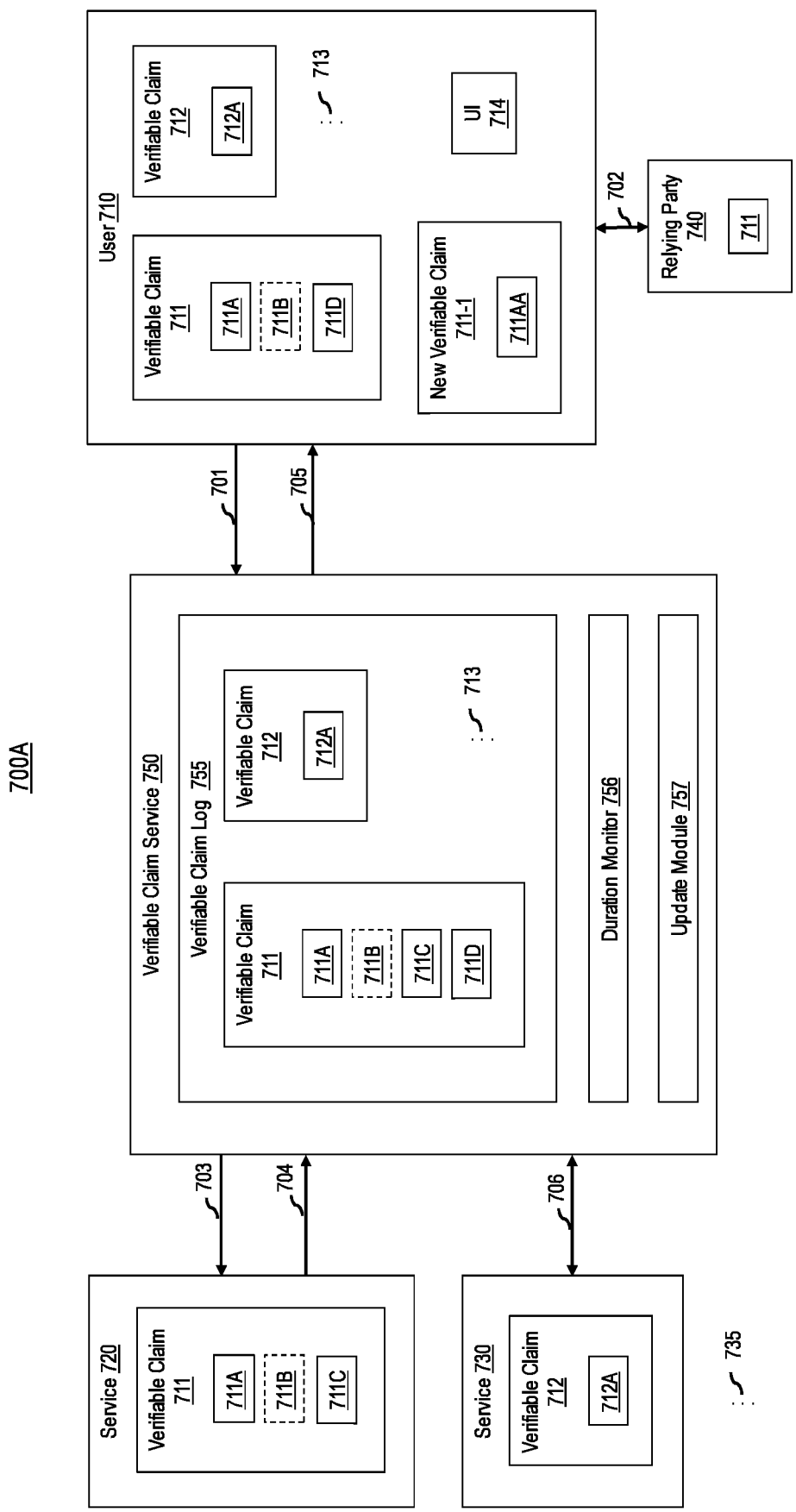
FIG. 7A illustrates an example embodiment of an environment where duration information metadata is used to update a verifiable claim.

FIG. 7A illustrates an embodiment of an environment 700A where a specific use of duration information metadata, such as duration information metadata 623, is used to determine how long a verifiable claim or credential, such as the verifiable claim or credential 600B, is to be valid for. As illustrated, the environment 700A includes a device a user 710 and his or her associated device (hereinafter referred to user 710 for ease of explanation), a service 720, a service 730, and any number of additional services as illustrated by the ellipses 735.

The service 720, which corresponds to the service 510 previously discussed, issues a verifiable claim 711 on behalf the user 710, who corresponds to the DID owner 201 and the users 520, 530, and 540 previously described. The verifiable claim 711, which corresponds to the verifiable claim or credential 600B also includes duration information metadata 711A, which corresponds to the duration information metadata 623. For example, the service 720 may be the DMV and issues a verifiable claim 711 that specifies that the user 710 has a valid driver's license. However, since the driver's license is only valid for a period of five years before needing to be renewed, the service 720 includes duration information metadata 711A that specifies that that the verifiable claim 711 will expire in five years. Thus, the duration information metadata 711A specifies an expiration time of the corresponding verifiable claim 711.

The service 730, which corresponds to the service 510 previously discussed, also issues a verifiable claim 712 on behalf the user 710. The verifiable claim 712, which corresponds to the verifiable claim or credential 600B also includes duration information metadata 712A, which corresponds to the duration information metadata 623. For example, the service 730 may be a doctor that issues a verifiable claim 712 that specifies a prescription for a certain medication that the user 710 will be able to obtain from a pharmacy. However, to control how many times the user 710 uses the prescription, the service 730 includes duration information metadata 712A that specifies that the prescription can only be used for a single time or specifies that the prescription can be used for five refills. Thus, the duration information metadata 712A specifies a predetermined number of times that the corresponding verifiable claim 712 can be accessed or used. As illustrated, the user 710 may include any number of additional verifiable claims as illustrated by ellipses 713 that are issued by any number of additional services as illustrated by the ellipses 735.

The environment 700A includes a relying party 740. As illustrated by the arrows 702, the user 710 provides the verifiable claim 711 to the relying party 740 to obtain a service or the like. For example, if the verifiable claim 711 specifies that the user 710 has a valid driver's license and the relying party 740 is a car rental agency, the user 710 provides the verifiable claim 711 so the he or she can rent a car. In some embodiments, to access the verifiable claim, the relying party 740 must do one or more of the following: (1) pay a predetermined amount of value such as money or cryptocurrency, (2) provide identification information, (3) provide one or more verifiable claim(s), (4) grant permission for accessing a portion of data, or (5) provide a particular service, such as renting the car. As illustrated by the ellipses 745, the user 710 is able to provide verifiable claim 711, the verifiable claim 712, and potentially any of the verifiable claims 713 to any number of other relying parties as illustrated by the ellipses 745.

The environment 700A includes a verifiable claim service 750. In one embodiment, the verifiable claim service 750 is implemented by a third party, such as a provider of the DID management module 320 and/or the identity hubs 410. In other embodiments, the verifiable claim service 750 is hosted on a server computer that is separate from any devices owned by the user 710, such as devices 301 owned by the DID owner 201. In other embodiments, the verifiable claim service 750 may be part of the DID management module 320 controller by the user 710 or may at least share some functions with the DID management module 320. Thus, the verifiable claim service 750 may be controlled by the user 710 or controlled by a third party other than the user 710.

The verifiable claim service 750 includes a verifiable claim log 755. In operation, the verifiable claim service 750 receives or accesses the various verifiable claims from the user 710 as illustrated by the arrow 701 and then stores or logs them in the verifiable claim 755. Thus, FIG. 7A shows that the verifiable claims 711, 712, and potentially any number of additional verifiable claims as illustrated by the ellipses 713 are logged in the verifiable claim log 755.

The verifiable claim service 750 includes a duration monitor 756. In operation, the duration monitor 756 monitors the verifiable claims logged in the verifiable claim log 755. In particular, the duration monitor 756 monitors the duration information metadata (e.g., duration information metadata 711A and 712A) to determine if any of the logged verifiable claims are scheduled to expire based on the duration information metadata. The duration monitor 756 then flags those of the verifiable claims that are scheduled to expire.

The verifiable claim service 750 further includes an update module 757. In operation, the update module 757 receives an indication of the flagged verifiable claims that are scheduled to expire from the duration monitor 756. The update module 757 then requests from the issuer of the verifiable claim update information that is useable to update or modify the duration of the verifiable claim. If the issuer consents to modify the duration of the verifiable claim, the issuer will provide the update information to the update module 757, who is then able to automatically update the duration. In some embodiments, the update information is new duration information metadata that specifies a new, extended time period or number of uses. The update module 757 updates the verifiable claim to include the new duration information metadata, which sets the duration to the new time period or number of uses. In other embodiments, as the update information the issuer issues a new verifiable claim that includes new duration information metadata that specifies the new time period or number of uses, but that is otherwise substantially the same as the expiring verifiable claim. The update module then replaces the expired verifiable claim with the new verifiable claim.

The issuer, however, may not consent to the request and may therefore not provide any update information. In such case, the verifiable claim that is scheduled to expire will be allowed to expire. In some embodiments, as will be explained in more detail to follow, the issuer may provide update information that causes the verifiable claim to automatically expire. In addition, the user 710 is able to manually cause the verifiable claim to expire.

Specific use cases of the verifiable claim service 750 will now be explained with reference to FIG. 7A. As previously described, the user 710 is issued the verifiable claim 711 by the service 720 and is issued the verifiable claim 712 by the service 730. As shown at 701, the verifiable claim service 750 receives or accesses the verifiable claims 711 and 712 and logs them in the verifiable claim log 755. The duration monitor 756 then monitors the duration information metadata 711A and 712A to determine if either verifiable claim 711 or verifiable claim 712 is set to expire based on the duration information metadata 711A or 712A respectively.

Suppose as mentioned above that the verifiable claim 711 is issued by the service 720 which is the DMV and specifies that the user 710 has a driver's license that is valid for five years. Further suppose that the duration information metadata 711A specifies that the verifiable claim 711 has a duration of five years from the time the verifiable claim is issued and that that time period is almost over. Accordingly, in the present use case, the duration monitor 756 determines, based on the duration information metadata 711A, that the verifiable claim 711 is set to expire. The duration monitor 756 flags the verifiable claim 711 and provides this information to the update module 757.

As shown at arrow 703, the update module 757 contacts the service 720 and requests update information that will modify the duration of the verifiable claim 711. In the present use case, the modification is intended to extend the time period of the verifiable claim 711 so that the user 710 is able to continue to use the underlying driver's license information.

Suppose that the user 710 has performed the steps required by the service 720 to renew his or her driver's license for another five years. Accordingly, the service 720 will provide update information to the update module 757 as shown at arrow 704 that will modify the duration. In one embodiment, the service 720 provides as update information new duration information metadata that specifies a new, extended time period. As illustrated, the new duration information metadata is shown as duration information metadata 711B. As illustrated by the dashed lines, the update module 757 modifies the verifiable claim 711 by replacing the duration information metadata 711A with the new duration information 711B. Thus, the new duration time period of the verifiable claim 711 is modified for another five years as specified by the new duration information metadata 711B. The updated verifiable claim 711 with the modified duration is then provided to the user 710 as shown at arrow 705 for use with the relying party 740 or other relying parties 745 as needed for the additional five years.

In another embodiment, the update information provided by the service 720 is a new verifiable claim 711-1. As illustrated in FIG. 7A, the new verifiable claim 711-1 is substantially the same as the expiring verifiable claim 711, but includes new duration information metadata 711AA that specifies a new, extended time period of another five years. The update module 757 replaces the expiring verifiable claim 711 with the new claim 711-1 having the new duration information metadata 711AA and provides this to the user 710 for use with relying parties for the additional five years. The expiring verifiable claim 711 is allowed to expire.

In some instances, the service 720 may desire to cause the verifiable claim 711 to expire before the time period specified in the duration information metadata 711A. For example, in the present use case, suppose that the user 710 has had his or her driver's license revoked for having too many speeding tickets. In such case, the service 720 provides updated duration information data 711C that revokes the verifiable claim by causing it to expire to the verifiable claim service 750. The duration information data 711C, which is an example of a directive received from the service 720, is added to the verifiable claim 711 by the update module 757, causing the verifiable claim 711 to automatically expire.

In another instance, the user 710 may desire to cause the verifiable claim 711 to expire before the time period specified in the duration information metadata 711A. For example, suppose that the user 710 moves to a new state before the expiration of the driver's license that is related to the verifiable claim 711. In such case, the user 710 will likely obtain a new driver's license from his or her new state DMV and so may no longer be legally able to use the verifiable claim 711. In such case, the user 710 may access a User Interface (UI) 714 of the device associated with the user and manually select updated duration information data 711D that revokes the verifiable claim 711 by causing it to expire. The duration information data 711D is added to the verifiable claim 711 by the update module 757, causing the verifiable claim 711 to automatically expire. This then allows the user 710 to receive a new verifiable claim that is related to his or her new driver's license from the new state DMV for use with the relying parties 740 and/or 745.

As illustrated by arrows 706, the verifiable claim service is also able to follow a similar process to automatically modify the duration of the verifiable claim 712. For example, based on the duration information metadata 712A, the duration module 756 can determine and flag when the verifiable claim 712 is about to expire. In the embodiment disclosed previously where the verifiable claim 712 is a prescription issued by the service 720 that is a doctor, the duration module 756 can flag the verifiable claim 712 when the user 710 is about to use the last number of authorized refills of the prescription. The update module 757 can contact the service 720 for update information. If the service 720 decides to extend the prescription by modifying the number uses, the service can provide new duration information metadata to be added to the existing verifiable claim 712 and thus adding to the number of authorized uses or it can provide a new verifiable claim that includes new the new number of uses and that will replace the expiring verifiable claim.

It will be appreciated that in use cases described above, the duration of the verifiable claim 711 is modified automatically without direct user 710 input. That is, it is the verifiable claim service 750 that controls the process by monitoring the duration information metadata of the logged verifiable claims and then initiating the update process for those verifiable claims that are set to expire. The user 710 or more precisely the device associated with the user 710 provides and receives information from verifiable claim service 750 automatically in the background without the direct input from the user 710, except in the case of the user 710 manually causing the verifiable claim to expire. Thus, the verifiable claim service 750 solves the problem of being able to update verifiable claims without having to put a large burden on the time and resources of the user 710.

Figure 7B:
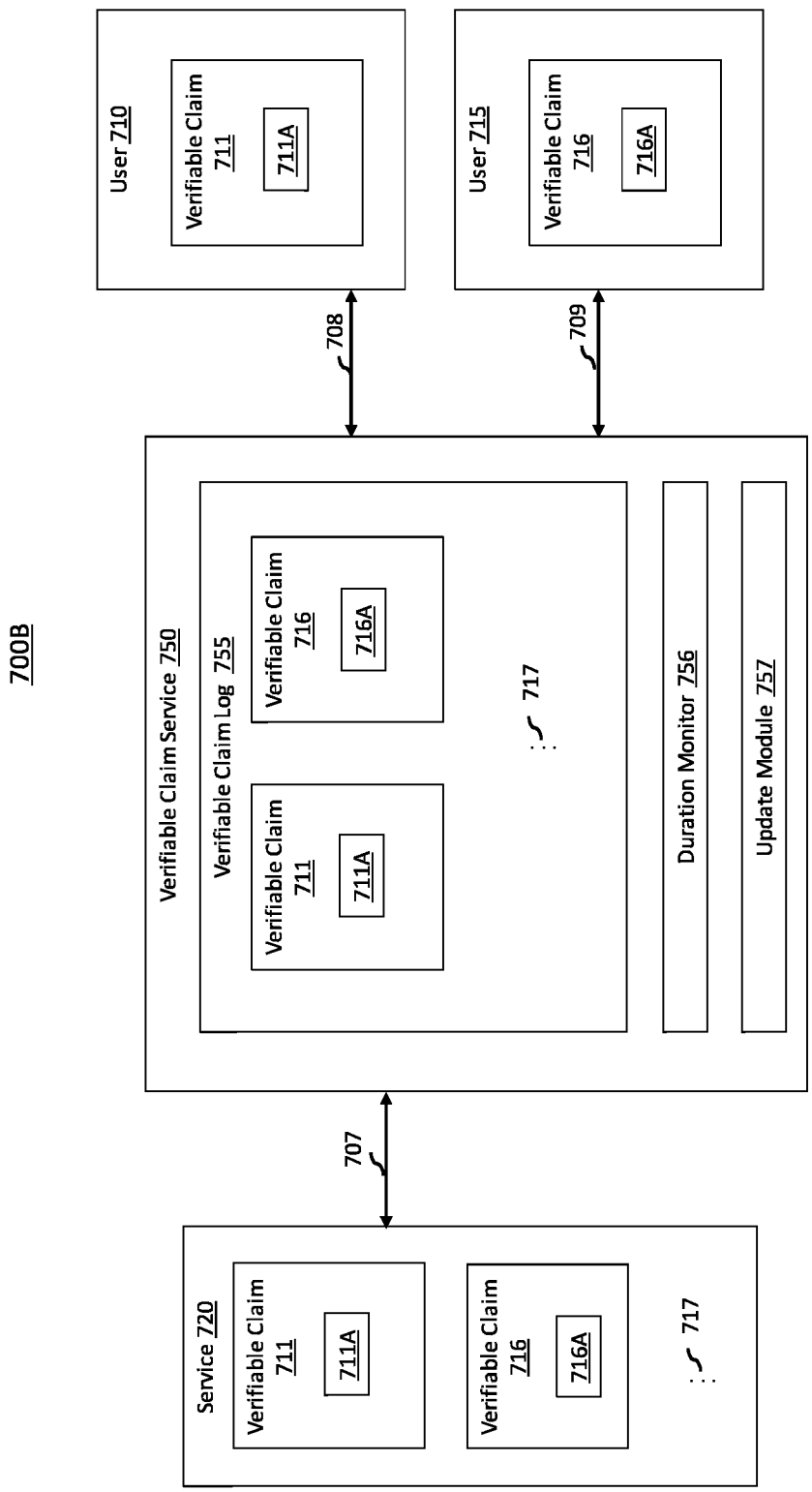
FIG. 7B illustrates an alternative embodiment of the environment of FIG. 7A.

FIG. 7B illustrates an embodiment of an alternative environment 700B of the environment 700A. Environment 700A illustrated how the verifiable claim service 750 is used to automatically update or modify the duration of the verifiable claims associated with the user 710. The environment 700B, however, illustrates that the verifiable claim service 750 is also usable to automatically update or modify the duration of the verifiable claims that are issued by a single service and provided to multiple users and their associated computing devices. In such embodiments, the verifiable claim service 750 will typically be associated with the computing system of the service that issues the verifiable claims.

As illustrated in FIG. 7B, the environment 700B includes the user 710, verifiable claim 711, duration information metadata 711A, service 720, and the verifiable claim service 750 and its elements as previously described in FIG. 7A. Accordingly, those elements discussed previously in relation to environment 700A need not be discussed in detail in relation to environment 700B.

The service 720, in addition to issuing the verifiable claim 711 on behalf of the user 710, also issues a verifiable claim 716 on behalf of a user 715 and his or her associated device (hereinafter referred to user 715 for ease of explanation), who corresponds to the DID owner 201 and the users 520, 530, and 540 previously described. The verifiable claim 716, which corresponds to the verifiable claim or credential 600B also includes duration information metadata 716A, which corresponds to the duration information metadata 623. For example, as mention above the service 720 may be the DMV and therefore would issues the verifiable claim 711 that specifies that the user 710 has a valid driver's license and also issues the verifiable claim 716 that specifies that the user 715 has a valid driver's license. As mentioned, the duration information metadata 711A specifies an expiration time of the corresponding verifiable claim 711. Likewise, the duration information metadata specifies an expiration time of the corresponding verifiable claim 716. Since the service 720 is the DMV, it also issue numerous additional verifiable claims as illustrated by ellipses 717 that specify that numerous other users as illustrated by the ellipses 718 have a valid driver's license.

The verifiable claim log receives and logs the verifiable claims 711, 716, and potentially any number additional verifiable claims as illustrated by the ellipses 717 from the service 720 as shown by arrows 707. The duration monitor 756 monitors the duration information metadata 711A and 716A in the manner previously described to determine, based on the duration defined in the duration information metadata, if the verifiable claim 711 and/or verifiable claim 716 are set to expire. Any of the verifiable claims that are set to expire are flagged by the duration monitor 756.

In the present use case, suppose that both of the verifiable claims 711 and 716 are set to expire. Accordingly, as shown by arrows 709 the update module contacts the service 720 and requests update information for both verifiable claims. If the service 720 agrees to modify the duration of the verifiable claims, it will provide the update information. As previously described, the update information may be new duration information metadata that specifies an extended time period of validity for both the verifiable claims. In such case, the update module modifies the verifiable claims 711 and 716 to include the new duration information metadata that sets the duration of the verifiable claim to the new, extended time period. Alternatively, the update information may be new verifiable claims 711 and 716 that include the new duration information metadata and that replace the expiring verifiable claims 711 and 716. As shown by arrows 708 and 709, the update module provides the modified verifiable claims 711 and 716 to the user 710 and 715 respectively.

It will be appreciated that in use case described above, the duration of the verifiable claims 711 and 716 is modified automatically without direct user 710 or user 715 input. That is, it is the verifiable claim service 750 that controls, on behalf of the service 720, the process by monitoring the duration information metadata of the logged verifiable claims and then initiating the update process for those verifiable claims that are set to expire. The user 710 and his or her associated device and the user 715 and his or her associated device provides and receives information from verifiable claim service 750 automatically in the background without the direct input from the user 710 or 715. Thus, the verifiable claim service 750 solves the problem of being able to update verifiable claims without having to put a large burden on the time and resources of the user 710. In addition, the verifiable claim service 750 also allows the service 720 to automatically control the updating of all (or at least a large portion of) the verifiable claims it issues on behalf of various users without the users having to be involved in the process.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
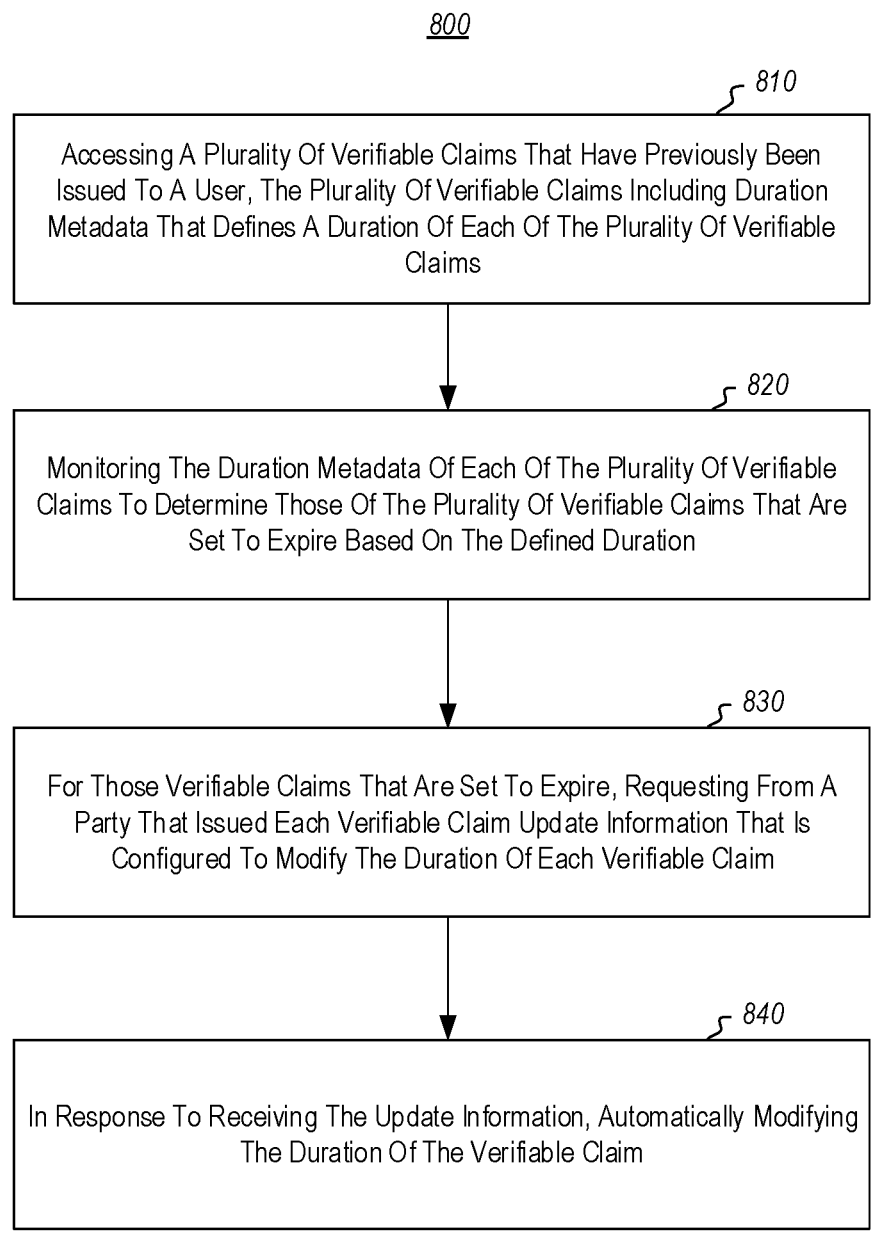
FIG. 8 illustrates a flowchart of an example method for updating a verifiable claim so that a duration of the verifiable claim can be modified without direct user input.

FIG. 8 illustrates a flow chart of an example method 800 for updating a verifiable claim so that a duration of the verifiable claim can be modified without direct user input. The method 800 will be described with respect to one or more of FIGS. 2-7 discussed previously.

The method 800 includes accessing a plurality of verifiable claims that have previously been issued to a user, the plurality of verifiable claims including duration metadata that defines a duration of each of the plurality of verifiable claims 810). For example, as previously described the verifiable claim service 750, specifically the verifiable claim log 755, accesses one or more of the verifiable claims 711, 712, 713, 716, and 717 issued to the users 710, 715, and 718. The verifiable claims include duration information metadata such as duration information metadata 711A, 712A, and 716A that defines a duration of each of the verifiable claims, such as expiration time period or a number of authorized uses.

The method 800 includes monitoring the duration metadata of each of the plurality of verifiable claims to determine those of the plurality of verifiable claims that are set to expire based on the defined duration (820). For example, as previously described the verifiable claim service 750, specifically the duration monitor 756 monitors the duration information metadata such as duration information metadata 711A, 712A, and 716A to determine which of the verifiable claims 711, 712, 713, 716, and 717 is set to expire.

The method 800 includes, for those verifiable claims that are set to expire, requesting from a party that issued each verifiable claim update information that is configured to modify the duration of each verifiable claim 830). For example, as previously described the verifiable claim service 750, specifically the update module 757 requests from the service 720, 730, and/or 735 update information that modifies the duration of the verifiable claims. The modification of the duration may be extending the expiration time period or authorized number of uses. The update information may be new duration information metadata such as new duration authorization metadata 711B or it may be a new verifiable claim such as new verifiable claim 711-1 which replaces the expiring verifiable claim.

The method 800 includes in response to receiving the update information, automatically modifying the duration of the verifiable claim 840). For example, as previously described the verifiable claim service 750, specifically the update module 757 automatically modifies the duration of the verifiable claim by adding the new duration information metadata such as new duration authorization metadata 711B to the verifiable claim or replacing the expiring verifiable claim with the new verifiable claim such as new verifiable claim 711-1 that includes new duration information metadata 711AA.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to operate in a decentralized and distributed network to manage decentralized identifiers (DID) and to update a verifiable claim that is associated with a particular DID so that a duration of the verifiable claim can be modified without direct user input, the computing system comprising:
   one or more processors; and
   one or more hardware storage devices that store computer-executable instructions that are executable by the one or more processors to cause the computing system to:
   access an identity hub that is configured to store attributes and metadata for a DID of a user, wherein the DID is configured to operate in conjunction with a distributed ledger that includes the decentralized and distributed network, and wherein the identity hub further implements a verifiable claim service;
   cause a plurality of verifiable claims to be stored in the identity hub, wherein the plurality of verifiable claims that have were previously been issued to the user, and wherein the plurality of verifiable claims include duration metadata that defines a duration of each of the plurality of verifiable claims;
   cause the verifiable claim service to monitor the duration metadata of each of the plurality of verifiable claims to determine those of the plurality of verifiable claims that are set to expire based on the defined duration, wherein the verifiable claim service flags those verifiable claims that are set to expire;
   for those verifiable claims that are set to expire and that are flagged by the verifiable claim service, cause the verifiable claim service to request from a party that issued each verifiable claim update information that is configured to modify the duration of each verifiable claim; and
   in response to receiving the update information, cause the verifiable claim service to automatically modify the duration of the verifiable claim.

2. The computing system of claim 1, further caused to:
   in response to not receiving the update information, allowing each verifiable claim to expire.

3. The computing system of claim 1, wherein the duration metadata comprises a predetermined number of times that the corresponding verifiable claim can be accessed or used.

4. The computing system of claim 1, further caused to:
   automatically cause each verifiable claim to expire in response to a directive received from the party that issued each verifiable claim.

5. The computing system of claim 1, further caused to:
   allow the user to manually cause the verifiable claim to expire.

6. The computing system of claim 1, wherein the update information is new duration metadata that specifies a new, extended time period or number of uses, and
wherein automatically modifying the duration of the verifiable claim comprises modifying each verifiable claim to include the new duration metadata, the new duration metadata setting the duration to the new, extended time period or number of uses.

7. The computing system of claim 1, wherein the update information is a new verifiable claim that includes new duration information metadata that specifies a new time period or number of uses, but that is otherwise substantially the same as the verifiable claim that is about to expire, and
wherein automatically modifying the duration of the verifiable claim comprises replacing the verifiable claim that is about to expire with the new verifiable claim.

8. The computing system of claim 1, wherein the verifiable claims comprise at least (1) the DID, (2) a property of the subject entity, (3) a value corresponding to the property, (4) a unique identifier identifying the corresponding verifiable claims, and (5) one or more conditions for accessing the verifiable claims.

9. The computing system of claim 8, the one or more conditions comprising at least one of the following: (1) requiring a relying entity to pay a predetermined amount of value, (2) requiring a relying entity to provide identification information, (3) requiring a relying entity to provide one or more verifiable claim(s), (4) requiring a relying entity to grant permission for accessing a portion of data, or (5) requiring a relying entity to provide a particular service.

10. The computing system of claim 1, wherein the computing system is associated with a management module controlled by the user.

11. The computing system of claim 1, wherein the computing system is associated with the party that issued each verifiable claim.

12. The computing system of claim 1, wherein the computing system is associated with a third party cloud computing provider.

13. A method implemented by a computing system configured to operate in a decentralized and distributed network to manage decentralized identifiers (DID) and to update a verifiable claim that is associated with a particular DID so that a duration of the verifiable claim can be modified without direct user input, the method comprising:
accessing a DID lifecycle management module that is configured to generate a DID for a user, wherein the DID is configured to operate in conjunction with a distributed ledger that includes the decentralized and distributed network, and wherein the DID lifecycle management module further implements a verifiable claim service;
accessing a plurality of verifiable claims, wherein the plurality of verifiable claims were previously issued to the user, and wherein the plurality of verifiable claims include duration metadata that defines a duration of each of the plurality of verifiable claims;
causing the verifiable claim service to monitor the duration metadata of each of the plurality of verifiable claims to determine those of the plurality of verifiable claims that are set to expire based on the defined duration, wherein the verifiable claim service flags those verifiable claims that are set to expire;
for those verifiable claims that are set to expire and that are flagged by the verifiable claim service, causing the verifiable claim service to request from a party that issued each verifiable claim update information that is configured to modify the duration of each verifiable claim; and
in response to receiving the update information, causing the verifiable claim service to automatically modify the duration of the verifiable claim.

14. The method of claim 13, wherein the duration metadata comprises one of an expiration time of the corresponding verifiable claim or a predetermined number of times that the corresponding verifiable claim can be accessed or used.

15. The method of claim 13, further comprising:
automatically causing each verifiable claim to expire in response to a directive received from the party that issued each verifiable claim.

16. The method of claim 13, further comprising:
allowing the user to manually cause the verifiable claim to expire.

17. The method of claim 13, wherein the update information is new duration metadata that specifies a new, extended time period or number of uses, and
wherein automatically modifying the duration of the verifiable claim comprises modifying each verifiable claim to include the new duration metadata, the new duration metadata setting the duration to the new, extended time period or number of uses.

18. The method of claim 13, wherein the update information is a new verifiable claim that includes new duration metadata that specifies a new time period or number of uses, but that is otherwise substantially the same as the verifiable claim that is about to expire, and
wherein automatically modifying the duration of the verifiable claim comprises replacing the verifiable claim that is about to expire with the new verifiable claim.

19. A computer system configured to operate in a decentralized and distributed network to manage decentralized identifiers (DID) and to update a verifiable claim that is associated with a particular DID so that a duration of the verifiable claim can be modified without direct user input, said computer system comprising:
one or more processors; and
one or more hardware storage devices that store instructions that are executable by the one or more processors to cause the computer system to:
access one of (i) a DID lifecycle management module that is configured to generate a DID for a user or (ii) an identity hub that is configured to store attributes and metadata for the DID of the user, wherein the DID is configured to operate in conjunction with a distributed ledger that includes the decentralized and distributed network, and wherein either the DID lifecycle management module or the identity hub implements a verifiable claim service
access a plurality of verifiable claims, wherein the plurality of verifiable claims were previously issued to the user, and wherein the plurality of verifiable claims include duration metadata that defines a duration of each of the plurality of verifiable claims;
cause the verifiable claim service to monitor the duration metadata of each of the plurality of verifiable claims to determine those of the plurality of verifiable claims that are set to expire based on the defined duration, wherein the verifiable claim service flags those verifiable claims that are set to expire;
for those verifiable claims that are set to expire and that are flagged by the verifiable claim service, cause the verifiable claim service to request from a party that issued each verifiable claim update information that is configured to modify the duration of each verifiable claim; and in response to receiving the update information, cause the verifiable claim service to automatically modify the duration of the verifiable claim.

\* \* \* \* \*